US007904462B1

(12) United States Patent
Thirumalai et al.

(10) Patent No.: US 7,904,462 B1
(45) Date of Patent: Mar. 8, 2011

(54) COMPARISON ENGINE FOR IDENTIFYING DOCUMENTS DESCRIBING SIMILAR SUBJECT MATTER

(75) Inventors: Srikanth Thirumalai, Clyde Hill, WA (US); Aswath Manoharan, Bellevue, WA (US); Mark J. Tomko, Seattle, WA (US); Grant M. Emery, Seattle, WA (US); Vijai Mohan, Bellevue, WA (US); Egidio Terra, Porto Alegre (BR)

(73) Assignee: Amazon Technologies, Inc., Reno, NV (US)

( * ) Notice: Subject to any disclaimer, the term of this patent is extended or adjusted under 35 U.S.C. 154(b) by 531 days.

(21) Appl. No.: 11/953,726

(22) Filed: Dec. 10, 2007

Related U.S. Application Data

(60) Provisional application No. 60/986,256, filed on Nov. 7, 2007.

(51) Int. Cl.
*G06F 7/00* (2006.01)
*G06F 17/00* (2006.01)

(52) U.S. Cl. .................................. 707/749; 707/750

(58) Field of Classification Search .................. 707/749, 707/999.003; 705/27
See application file for complete search history.

(56) References Cited

U.S. PATENT DOCUMENTS

| | | | |
|---|---|---|---|
| 6,401,084 B1 * | 6/2002 | Ortega et al. | 707/706 |
| 6,535,880 B1 * | 3/2003 | Musgrove et al. | 1/1 |
| 6,745,178 B1 * | 6/2004 | Emens et al. | 707/741 |
| 6,850,900 B1 * | 2/2005 | Hare et al. | 705/26 |
| 6,871,198 B2 * | 3/2005 | Neal et al. | 1/1 |
| 7,082,426 B2 * | 7/2006 | Musgrove et al. | 1/1 |
| 7,085,736 B2 * | 8/2006 | Keezer et al. | 705/27 |
| 2002/0116291 A1 * | 8/2002 | Grasso et al. | 705/27 |
| 2003/0065643 A1 * | 4/2003 | Musgrove et al. | 707/1 |
| 2005/0251409 A1 * | 11/2005 | Johnson et al. | 705/1 |

* cited by examiner

*Primary Examiner* — Yicun Wu
*Assistant Examiner* — Pavan Mamillapalli
(74) *Attorney, Agent, or Firm* — Robert C. Kowert; Meyertons, Hood, Kivlin, Kowert & Goetzel, P.C.

(57) ABSTRACT

Systems and methods for determining whether a first document is a potential duplicate of a second document such that the two documents describe the same or substantially the same subject matter, wherein the first and second documents include attribute data in attribute fields. A set of rules is obtained for determining whether the first document is a potential duplicate of the second document. Moreover, for each rule in the set of rules, a determination is made as to whether data in a first set of attributes of the first document is contained in a second set of attributes of the second document. According to the results of the evaluated rules in the rules set, determining whether the first document is a potential duplicate of the second document. If, according to the evaluated rules in the rules set, the first document is determined to be a potential duplicate of the second document, storing a reference to the first document in a set of potential duplicates of the second document.

20 Claims, 9 Drawing Sheets

COMPARISON ENGINE FOR IDENTIFYING DOCUMENTS DESCRIBING SIMILAR SUBJECT MATTER

CROSS-REFERENCE TO RELATED APPLICATION

This application claims the benefit of U.S. Provisional Patent Application No. 60/986,256, filed Nov. 7, 2007, which is incorporated herein by reference.

BACKGROUND

Figure 1:
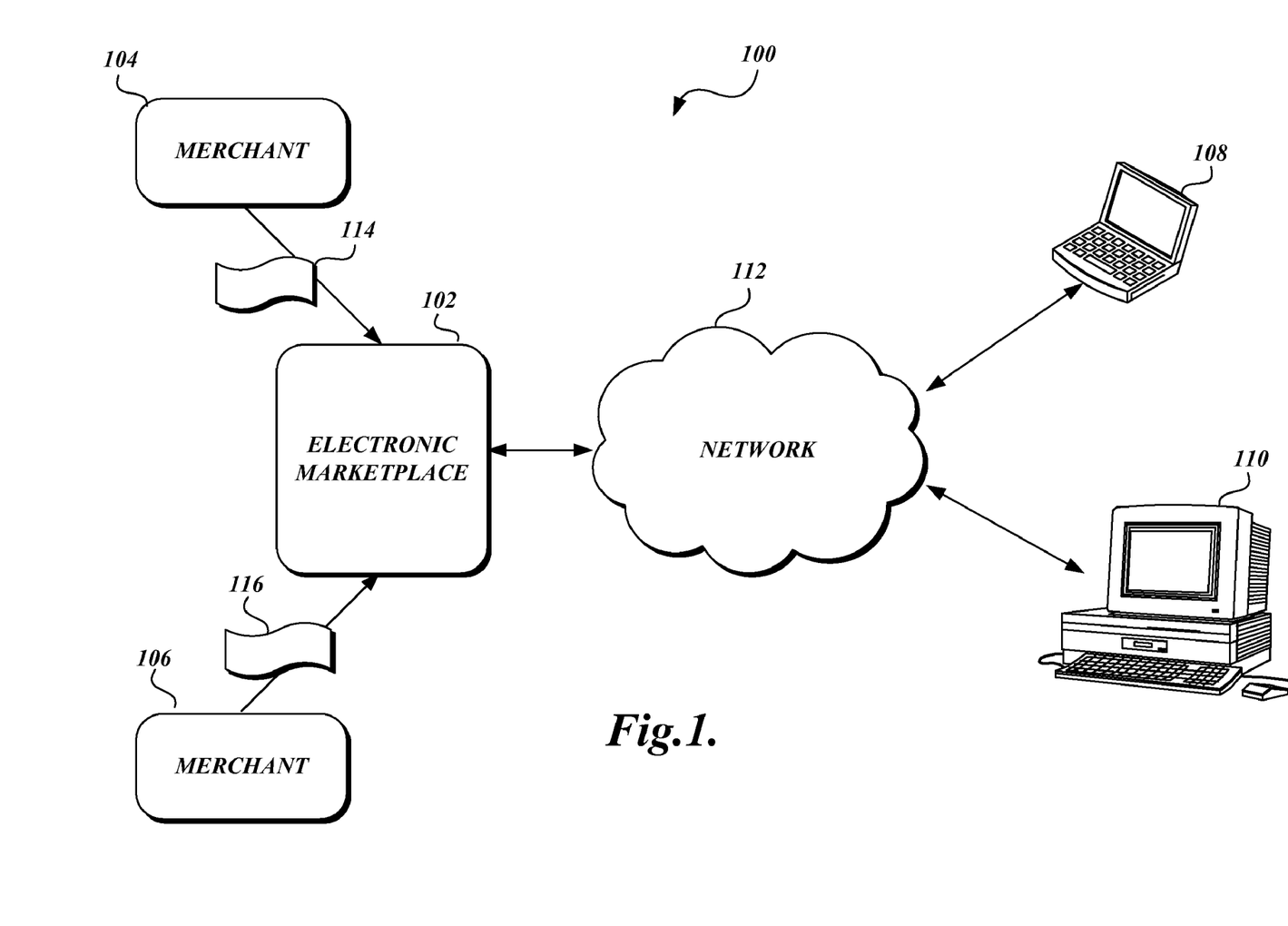
FIG. 1 is a pictorial diagram of an illustrative network environment of a hosted electronic marketplace where multiple merchants can offer products and services for sale to consumers connecting to the electronic marketplace via user computers over a network.

An online multi-merchant electronic marketplace is a virtual location where multiple merchants compete in selling a variety of products and services. Products and services for sale via the electronic marketplace are usually described in documents (product descriptions) submitted by the various merchants. FIG. 1 shows an illustrative network environment 100 of a hosted electronic marketplace 102 where multiple merchants 104-106 can offer products and services for sale to consumers connecting to the electronic marketplace via user computers 108-110 over a network 112. The consumer will typically browse the various products and/or services using a browser, which displays product descriptions about the products. These product descriptions, such as product descriptions 114-116, are provided by the merchants 104-106 to the electronic marketplace over the network 112. Typically, the electronic marketplace 102 will store the product descriptions 114-116 in a data store (not shown) that is referred to hereafter as a document corpus (i.e., a body of product descriptions/documents).

With regard to the product descriptions submitted by the merchants to the electronic marketplace, these documents are typically structured in a manner such that the electronic marketplace can identify and extract relevant information in order to categorize and display the information to consumers. Included in the structured data is typically a collection of attribute/value pairs according to the type of product or service for sale. For example, books are described by their ISBN, title, contributors, publication date, binding, publisher, volume, edition, and several other attributes, each of these attributes forming attribute/value pairs.

While merchants provide attribute/value information regarding the products or services that they want to sell, two different merchants will seldom agree on a common set of attribute/value pairs regarding the same product. Moreover, even when they seemingly provide the same information, the content, data, and/or semantics of the various attributes can vary widely. For example, while many merchants desirably provide a "part number," one merchant may choose to provide the part number of a product in a "part number" attribute field, a second merchant might provide the part number for the very same product in a "catalog number" attribute field, and a third merchant might provide the part number in a "model number" attribute field. Further still, a common source of inconsistency of product descriptions of the same product from different manufacturers relates to the "manufacturer name" and "brand name" attribute fields. Simply stated, merchants differ substantially in what they place in these attribute fields. In short, attribute fields may be used similarly or synonymously by some merchants and used to mean two widely different things by other merchants.

Another common source of inconsistency is in the "title" attribute that is meant to serve as a short description for the same product. Indeed, merchants often associate different semantics with this attribute. Some merchants construct the "title" attribute field using the brand name, the part number and the noun phrase to describe the product, such as "Sanitaire SC684 Upright Vacuum Cleaner." Other merchants will omit the brand and part number information in the "title" attribute field, but use it instead to provide information about salient features of the product.

Clearly, it is desirable for an electronic marketplace 102 to match product descriptions of a first merchant to product descriptions of a second merchant when they describe the same product (or service). Indeed, when a consumer (via a user computer 108) browses in the electronic marketplace 102 in search for "Item X," all instances of Item X should be available to the user from a single display location. This requires that the electronic marketplace 102 identify "duplicate" product descriptions from multiple merchants. By "duplicate" it is meant that a first product description describes the same or substantially the same product as described in a second product description. Unfortunately, given such inconsistencies between merchants in regard to the information describing a product or service in a product description, any service that attempts to establish similarity between two product descriptions on the basis of a strict comparison of attribute fields between two product descriptions will have very poor results in identifying those documents that are duplicates. Identifying documents that are (at least potentially) duplicates is referred to as "recall." On the positive side, strict attribute field comparisons will yield very accurate results, i.e., the potential duplicates will likely be true duplicates. Identifying true duplicate product descriptions is referred to as "precision."

In contrast to simple attribute field comparisons, completely ignoring structure, particularly ignoring the attribute/value pairs, and comparing all terms in a product description to another product description, "solves" the issue of poor recall. One example of a system employing a non-fielded comparison between two documents is described in commonly owned and co-pending U.S. patent application Ser. No. 11/754,237, filed May 25, 2007, entitled Duplicate Entry Detection System and Method, and U.S. patent application Ser. No. 11/754,241, filed May 25, 2007, entitled Generating Similarity Scores for Non-Identical Character Strings, which are incorporated by reference. However, completely disregarding the structure information in product descriptions diminishes the precision of a comparison engine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 2:
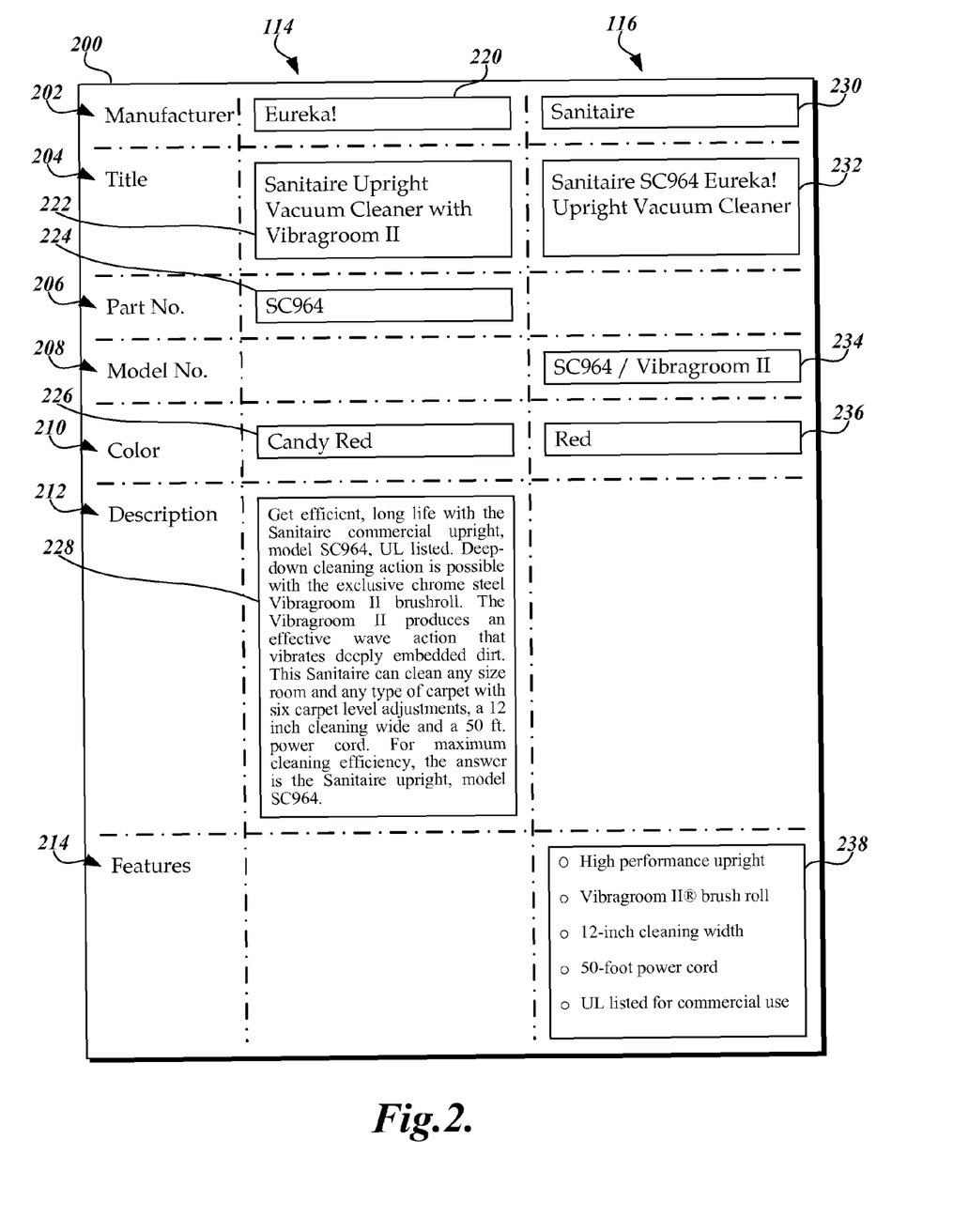
FIG. 2 is a pictorial diagram of an illustrative table showing a side-by-side comparison of illustrative product descriptions useful for describing aspects of the disclosed subject matter.

In order to more clearly set forth a description of the disclosed subject matter, illustrative product descriptions are set forth. In particular, FIG. 2 is a pictorial diagram of an illustrative table 200 showing a side-by-side comparison of illustrative product descriptions 114 and 116 and useful for describing aspects of the disclosed subject matter.

In regard to the illustrated product descriptions 114 and 116, it is assumed that these documents are, at least partially, structured according to attributes. By way of explanation, table 200 is comprised of three columns, where the first column identifies attributes found within one of the two product descriptions 114 and 116, and the second and third columns correspond to the corresponding attribute values of product descriptions 114 and 116, respectively.

The union of attributes from both product descriptions 114 and 116 includes a manufacturer attribute 202, a title attribute 204, a part number attribute 206, a model number attribute 208, a color attribute 210, a description attribute 212, and a features attribute 214. However, as can be seen, product description 114 does not have any information for the model number attribute 208 and features attributes 214, while product description 116 does not have information for the part number attribute 206 and the description attribute 212. Moreover, even for those attributes that are included in both product descriptions 114 and 116, specifically the manufacturer attribute 202, the title attribute 204, and the color attribute 210, the values do not match well, if at all. However, in spite of the differences cited above, a human evaluation would likely conclude that the two product descriptions 114 and 116 are duplicates in that they describe the same product.

Rather than simply discarding the structure/attributes defined in the product descriptions or attempting to match attribute to attribute, in one embodiment of the disclosed subject matter, in an effort to determine whether two product descriptions are duplicates, tokens from an attribute of a first product description are compared to tokens in a set of attributes of a second product description. For example, the part number 224 "SC964" in part number attribute field 206 of product description 114, while not having a corresponding part number value in product description 116, could be compared (by way of example) to the attribute values of a set of attributes comprising the model number attribute 208, the title attribute 204, the part number attribute 206, a catalog number attribute (not shown), and the like. By comparing tokens from an attribute field of a first product description to a set of attributes in a second product description, the discrepancies between merchants as to where they place salient information regarding a product can be minimized, and both duplicate recall and precision can be improved. As will be described below, these sets of attributes may be defined within a set of rules to be executed/evaluated in comparing two product descriptions to determine if the two descriptions are potentially duplicates of one another.

Indeed, other comparison systems typically perform a named entity recognition (NER) comparison on a first document, to locate key terms, such as the part number 224 "SC964" in product description 114, and then locate that term in the second product description 116. Unfortunately, it is difficult to accurately implement named entity recognition. As will become apparent from the following discussion, the disclosed subject matter obviates the need to perform named entity recognition comparisons.

Figure 3:
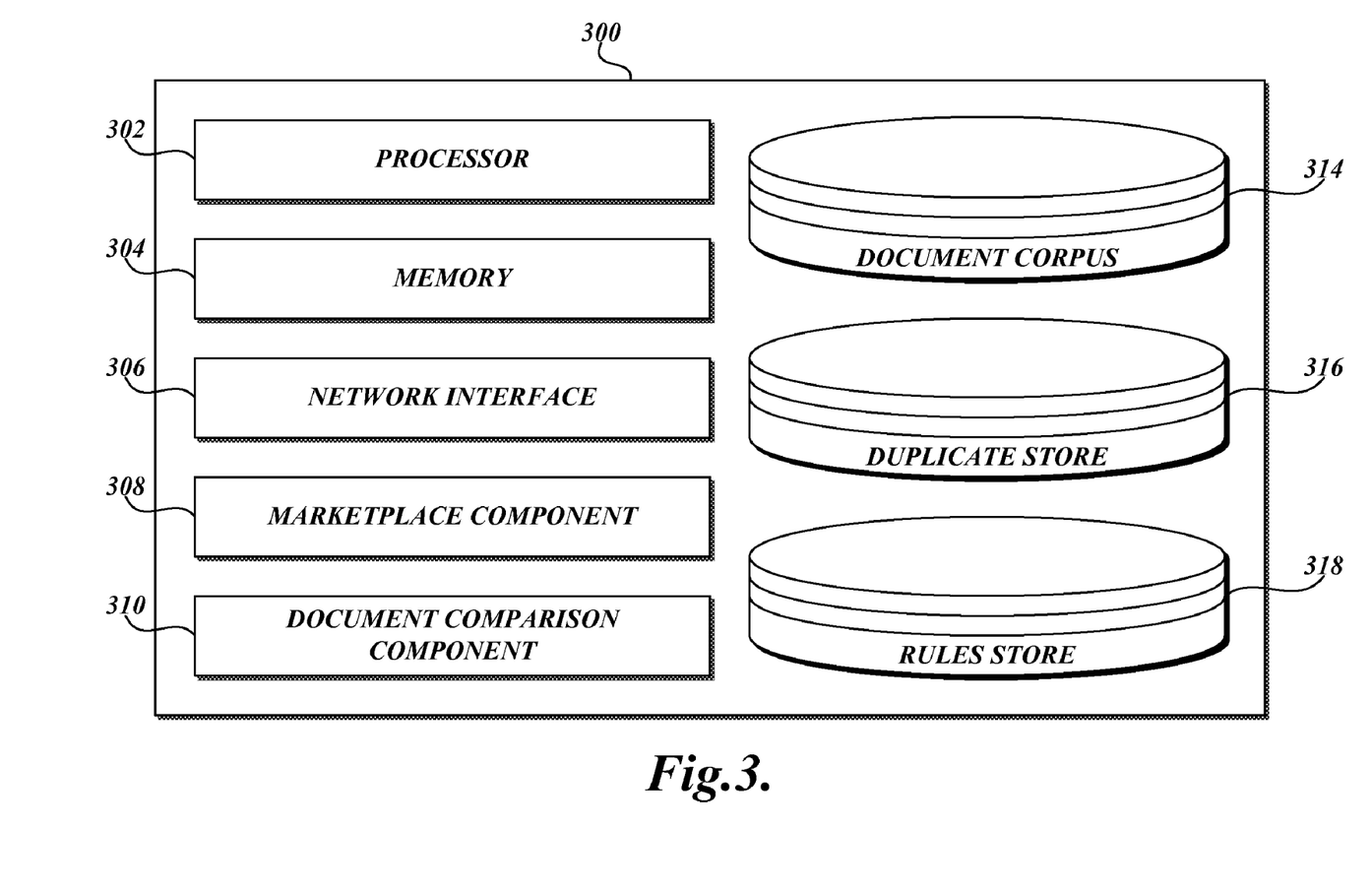
FIG. 3 is a pictorial diagram of logical components of an illustrative computing device suitable for hosting an electronic marketplace and configured to receive a product description from a merchant and identify potential duplicate product descriptions in a document corpus.

Turning now to a host system that conducts the electronic marketplace and further receives product descriptions from merchants of products and services for sale, FIG. 3 is a pictorial diagram of logical components of an illustrative computing device 300 suitable for hosting an electronic marketplace 102 and configured to receive a product description from a merchant and identify potential duplicate product descriptions in a document corpus. As shown in FIG. 3, the illustrative computing device 300 includes a processor 302 and a memory 304. As those skilled in the art will appreciate, the processor 302 executes computer-executable instructions in carrying out the functions of the computing device, including instructions to host an electronic marketplace as well as to identify potential duplicates of a received product description in a document corpus. The memory 304 may be comprised of random access memory (RAM), read-only memory (ROM), disk storage, remote online storage, and the like, and configured to store computer-executable instructions and data. Still further, the computing device 300 includes a network interface for interfacing the computing device 300 with the network 112, over which the hosted electronic marketplace receives product descriptions from merchants 104-106.

The illustrated computing device 300 also includes various executable modules for performing aspects of identifying potential duplicates in a document corpus for a received product description. These executable modules include a marketplace component 308 that provides the functionality for hosting the electronic marketplace 102, and a document comparison component 310 that compares a received product description against other product descriptions in a document corpus to identify potential duplicates.

While the executable modules 308-310 are illustrated as residing outside of the memory 304, this is for illustration purposes only and should not be construed as limiting upon the disclosed subject matter. In actual embodiments, the executable modules 308-310 may be in hardware, software, or a combination of hardware and software such that all or some of the executable modules may reside in memory 304.

The illustrated computing device 300 is shown as including a document corpus 314 storing a plurality of product descriptions of products and services for sale on the electronic marketplace 102. While illustrated as part of the computing device 300, in an alternative embodiment, the document corpus 314 may reside outside of the computing device 300, though communicatively coupled to the computing device. Moreover, while FIG. 3 suggests that the document corpus is contained within a database, this is for illustration purposes only and should not be construed as limiting upon the disclosed subject matter. In various embodiments, the document corpus 314 may be implemented as an online service, or in configurations not including a database.

Also illustrated in FIG. 3 is an optional duplicate store 316 for storing information regarding potential duplicates of a received product description, including sets of potential duplicate product descriptions. As with the document corpus 314, while shown as included in the computing device 300, in an actual embodiment the duplicate store 316 may optionally reside outside of the computing device, though communicatively coupled to the computing device. Still further, while FIG. 3 suggests that the duplicate store 316 is contained within a database, this is for illustration purposes only. In various embodiments, the duplicate store 316 may be implemented as an online storage service, or in various configurations not including a database.

FIG. 3 further includes a rules store 318 that stores rule sets and associated information used by the document comparison component 310 to compare two product descriptions to determine if they are actual or potential duplicates. The structure of rule sets is discussed in greater detail below in regard to FIG. 5. While shown as included in the computing device 300, in an actual embodiment, the rules store 318 may optionally reside outside of the computing device, though remaining communicatively coupled to the computing device. Still further, while FIG. 3 suggests that the rule store 318 is contained within a database, this is for illustration purposes only. In various embodiments, the rule store 318 may be implemented as an online storage service or, in various configurations, not including a database.

While components of a computing device suitable for identifying potential duplicates of a received product description from a document corpus 314 are illustrated, it should be appreciated that these components are logical components and, in an actual embodiment, may be combined with other components, including components not shown in FIG. 3, that may exist on any given computing device.

Figure 4:
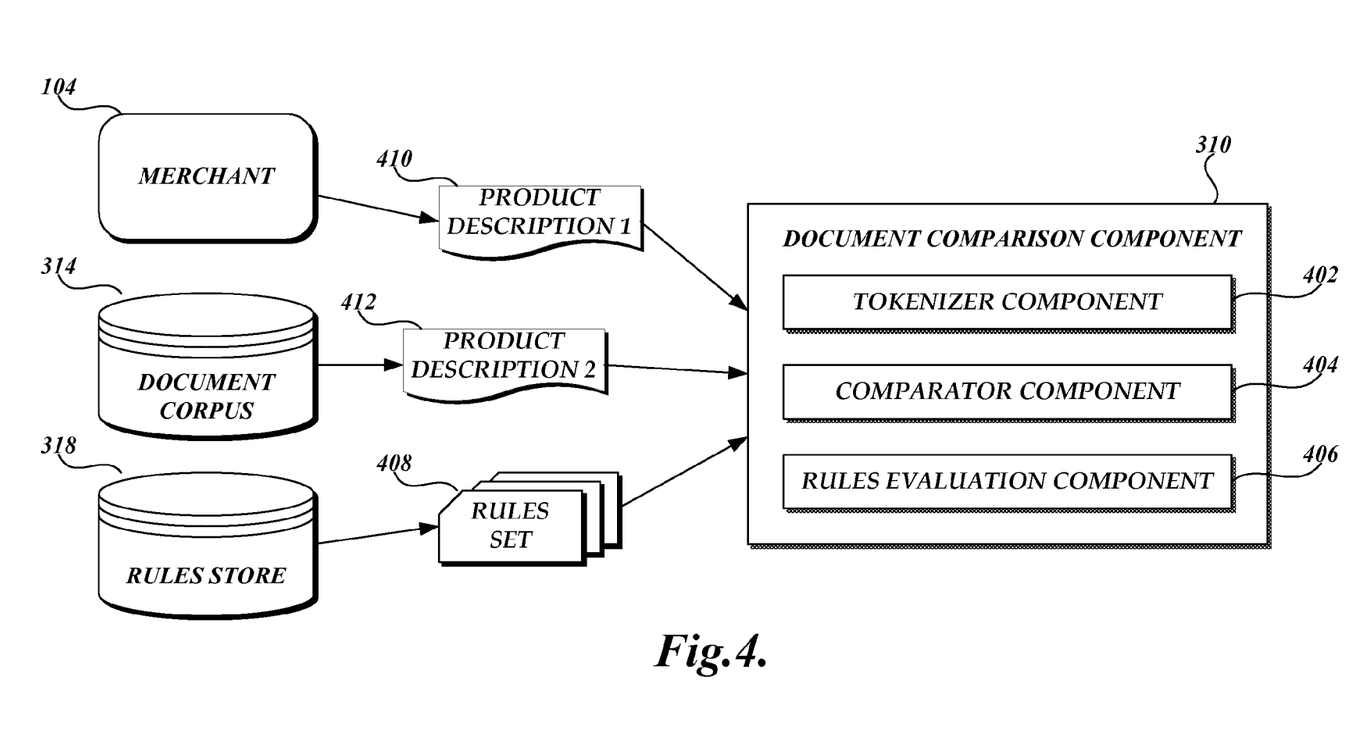
FIG. 4 is a pictorial diagram illustrating aspects of processing a received product description to determine whether the received product description is a duplicate of a product description from the document corpus according to aspects of the disclosed subject matter.

In regard to the document comparison component 310 and its operation, FIG. 4 is a pictorial diagram illustrating aspects and logical components of the document comparison component in processing a first product description 410 (referred to as PD1) received from a merchant 104 and a second product description 412 (referred to as PD2) retrieved from the document corpus 314 to determine whether PD1 410 is a duplicate of PD2 412. In particular, document comparison component 310 determines whether PD1 410 and PD2 412 are duplicates according to a rules set 408 obtained from the rules store 318.

Included in the document comparison component 310 are logical components including a tokenizer component 402, a comparator component 404, and a rule evaluation component 406. However, it should be appreciated that these components are logical components for performing various functions of the document comparison component, and that in an actual embodiment, these components may be combined with other components, including components not illustrated). Accordingly, the enumeration of logical components should be viewed as illustrative, and not limiting upon the disclosed subject matter.

The tokenizer component 402 is used to tokenize data (i.e., identify discrete words, phrases, numbers, and the like) in attribute fields of PD1 410 and PD2 412 such that a comparison between the two product descriptions may be made. As will be discussed in greater detail below, the tokenizer component 402 may selectively tokenize the data of one or more attribute fields according to various tokenizing algorithms, including a whitespace algorithm that tokenizes the data based on white space, a Lucene standard algorithm, and an aggressive algorithm that uses the Lucene standard algorithm and then divides alpha-numeric tokens into alphabetic tokens and numeric tokens.

The comparator component 404 compares tokens from attribute fields of PD1 410 to tokens from attribute fields of PD2 412 according to one or more of various comparator algorithms that may be selectively specified in the rules set (and particularly in rule conditions discussed below). The various comparator algorithms include a Levenstein edit-distance comparison algorithm; a phonetic comparison algorithm that uses the Refine Soundex code and the Double Metaphone code of tokens as a basis for comparison; a prefix comparison algorithm that weights prefixes heavily (i.e., sil and silver would be scored high as a match); a consonant comparison algorithm that drops vowels (unless the vowel is at the start of a word) and compares the tokens; a stemmed comparison algorithm that applies language-appropriate stemming and compares the stemmed tokens; and exact match comparison algorithm that performs an exact string comparison on the tokens after converting alphabetic characters in the tokens to lower (or upper) case.

The rule evaluation component 406 evaluates the rules of the rules set 408 with regard to the two product descriptions PD1 410 and PD2 412 to determine whether they are duplicates. The rule evaluation component 406 may selectively evaluate the two product descriptions PD1 410 and PD2 412 in a symmetric, strictly symmetric, or asymmetric manner as discussed below.

Figure 5:
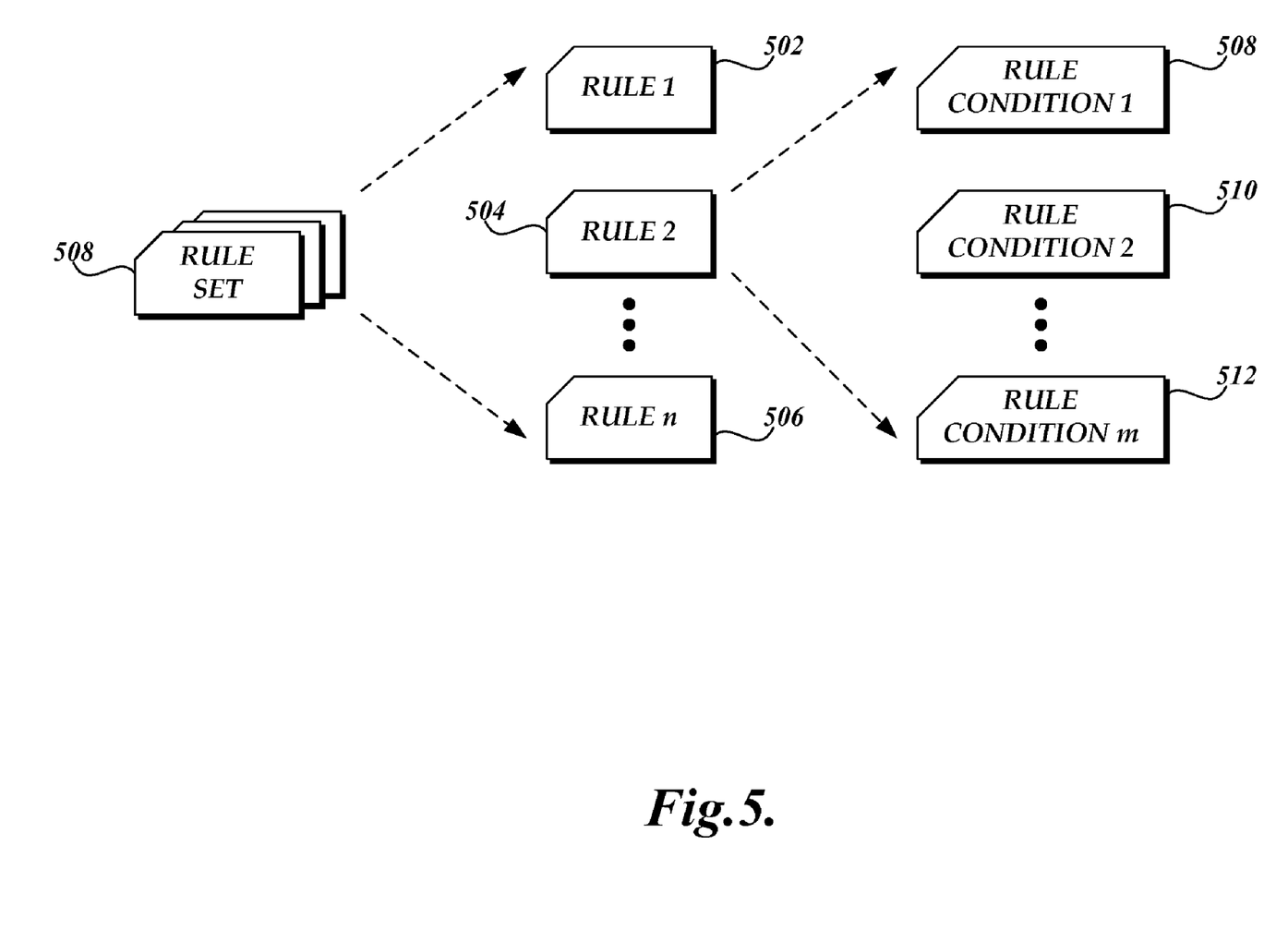
FIG. 5 is a block diagram illustrating aspects of the arrangement/structure of a rule set used in determining whether a first product description is a duplicate of a second product description according to aspects of the disclosed subject matter.

Prior to further discussing the evaluation of product descriptions PD1 410 and PD2 412 to determine whether they are duplicates, an understanding of the organization and/or the structure of the rules for evaluation of two product descriptions is appropriate. To that end, FIG. 5 is a block diagram illustrating aspects of the arrangement or structure of a rule set 508 used in determining whether a first product description (PD1 410) is a duplicate of a second product description (PD2 412). As already mentioned, the document comparison component 310 obtains a rules set 408 from the rules store 318 in order to evaluate whether the two product descriptions, PD1 410 and PD2 412, are duplicates. According to one embodiment of the disclosed subject matter, each rules set comprises one or more rules 502-506 that are to be evaluated against the product descriptions PD1 410 and PD2 412 to determined whether they are duplicates. Furthermore, each rule, such as rule 504, is comprised of one or more rule conditions 508-512 that are evaluated against the product descriptions PD1 410 and PD2 412 to determine whether they are duplicates. In short, a determination as to whether product descriptions PD1 410 and PD2 412, as determined by the rules set 408, are dependent upon the results of each rule 502-506 in the rules set, and in their turn, each rule 502-506 is determined/dependent upon the results of each rule condition 508-512 in the rule.

According to one embodiment, the evaluation of the rules set 408 with respect to two product descriptions PD1 410 and PD2 412 yields a true or false result, where true indicates that the two product descriptions are potential duplicates, and where false indicates the two product descriptions are not duplicates. If the result is true, in one embodiment, a strength of match score (i.e., a value within a predetermined range, such as 0.00 to 1.00) is provided that corresponds to the strength or confidence of the document comparison component 310 of the determination that the two product descriptions PD1 410 and PD2 412 are duplicates. This match score may be later used in a further examination and/or evaluation of the two product descriptions to determine whether they are actual duplicates.

Figure 6:
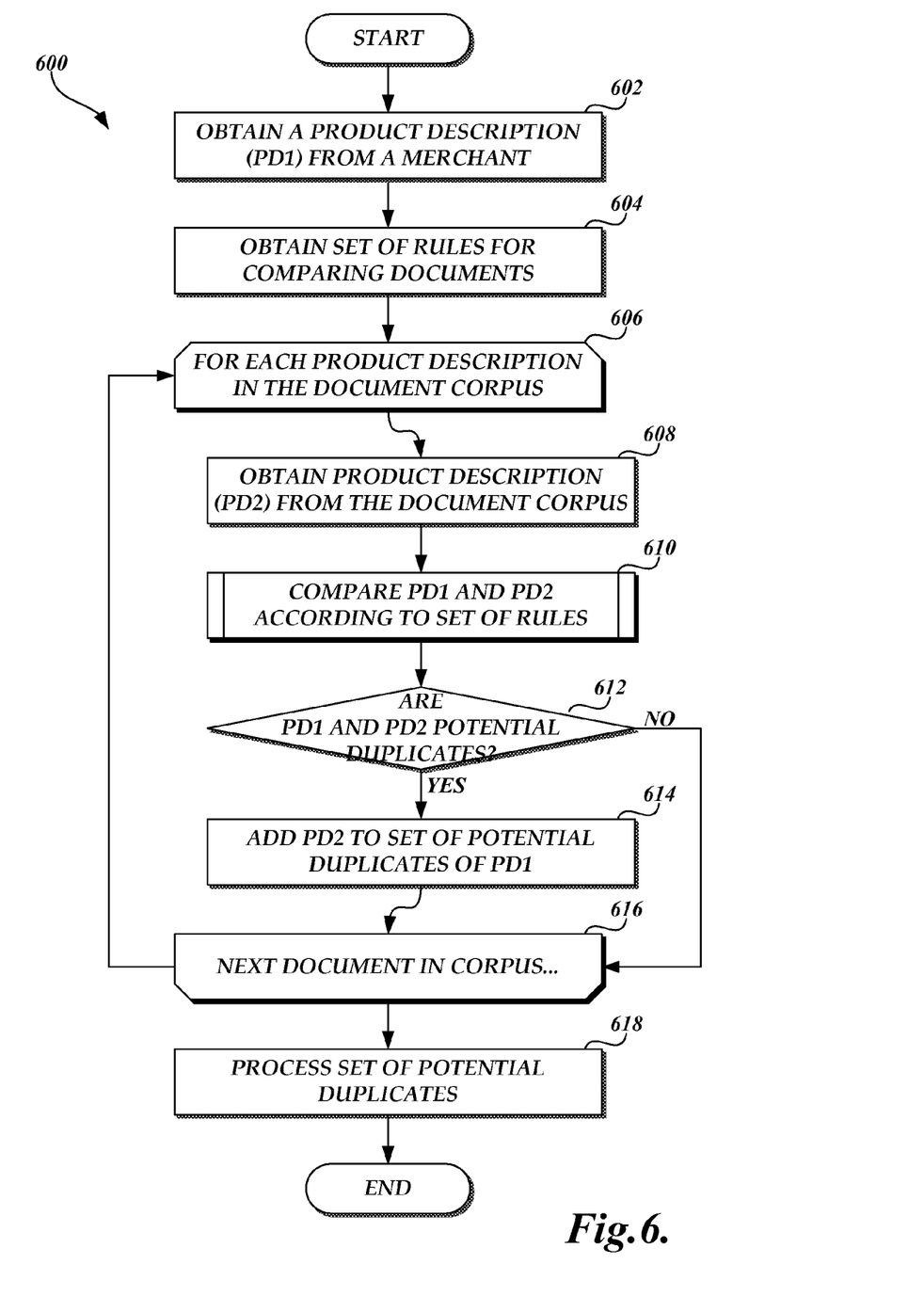
FIG. 6 is a flow diagram of a comparison routine suitable for determining whether a received product description is a duplicate of another product description in a document corpus according to aspects of the disclosed subject matter.

Turning now to generally determining whether a product description received from a merchant is a duplicate of another product description in a document corpus, FIG. 6 is a flow diagram of a comparison routine 600 suitable for determining whether a received product description is a duplicate of another product description in a document corpus 314, according to aspects of the disclosed subject matter. Beginning at block 602, a product description (PD1 410) is obtained from a merchant 104. At block 604, a rules set 408 is obtained from the rules store 318 for determining whether the obtained product description PD1 is a potential duplicate of another product description in the document corpus 314.

At control block 606, a looping construct is begun to iterate/loop through all or some of the product descriptions in the document corpus 314 to identify one or more potential duplicates for the obtained product description PD1 410. As those skilled in the art will appreciate, this looping construct includes steps 608-614 and ends at end control block 616. Moreover, at end control block 616, if there are additional product descriptions in the document corpus 314 to be evaluated against the obtained product description PD1 410, the routine 600 returns to control block 606 and repeats the iterated steps. Accordingly, at block 608, a product description PD2 412 is obtained from the document corpus 314 for comparison to the received product description PD1 410.

At block 610, product descriptions PD1 410 and PD2 412 are compared according to the obtained rules set 408. Comparing product descriptions PD1 410 and PD2 412 according to an obtained rules set 408 is discussed below in regard to FIG. 7. After comparing the product descriptions, at decision block 712 a determination is made as to whether product descriptions PD1 410 and PD2 412 are potential (if not actual) duplicates according to the results of the comparison of block 610. If product descriptions PD1 410 and PD2 412 are potential duplicates, at block 614 product description PD2 412 is added to a set of potential duplicates for product description PD1 410. Typically included with PD2 412 in the set of potential duplicates is the match score that is determined by the comparison of block 610.

At end control block 616, the routine 600 either returns to control block 606 to iterate through other product descriptions in the document corpus 314, as set forth above, or proceeds to block 618. At block 618, the set of potential duplicate product descriptions corresponding to the obtained product description PD1 410 is processed. Processing the set of potential duplicate product descriptions alternatively includes storing the set in the duplicate store 316, forwarding the set on to another process for further determinations as to whether any or all of the product descriptions in the set are actual duplicates of product description PD1 410, or presenting the set of potential duplicate product descriptions for display to a user for a final determination as to which, if any, of the product descriptions in the set are actual duplicates of product description PD1 410. Of course, these alternatives should be viewed as illustrative only, and not limiting upon the disclosed subject matter. Other processing actions of the set of potential duplicate product descriptions may be implemented, each of which is anticipated as falling within the scope of the disclosed subject matter. Thereafter, routine 600 terminates.

Figure 7:
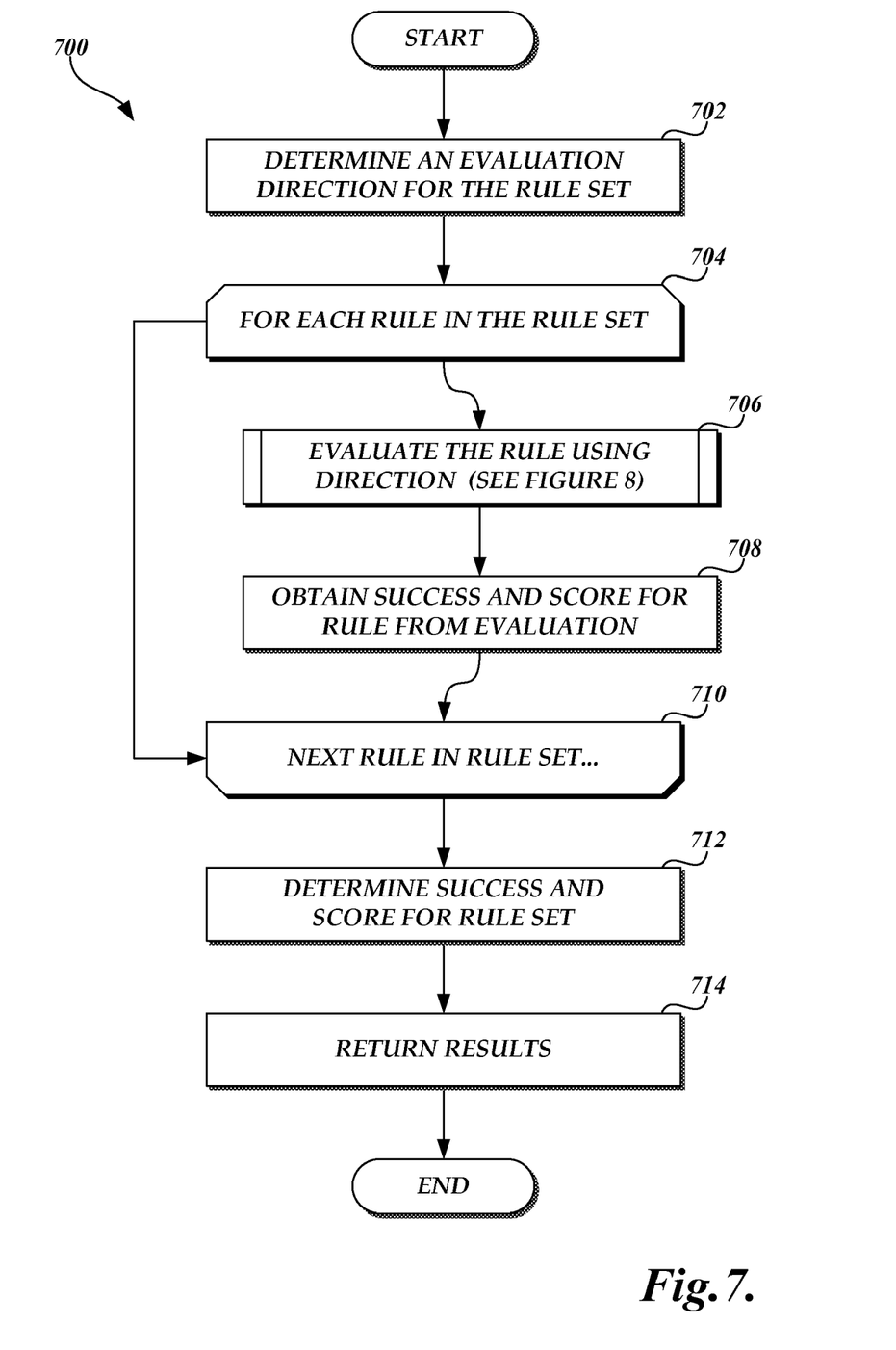
FIG. 7 is a flow diagram of an illustrative routine for comparing two product descriptions according to rules in a rule set in accordance with aspects of the disclosed subject matter.

Turning now to comparing a first product description PD1 410 to a second product description PD2 412 (as referenced in block 610), FIG. 7 is a flow diagram of an illustrative routine 700 for comparing two product descriptions according to the rules in rules set 408. Beginning at block 702, an evaluation direction for the rules in rules set 408 is determined. According to one embodiment, the evaluation direction may be optionally included in the rules set 408, and if not included in the rules set, a default direction is selected. An evaluation direction may be one of three values: strictly symmetrical, symmetrical, and asymmetrical. Strictly symmetrical evaluation requires that the same rules succeed in both directions for the document comparison component 310 to conclude that the documents are duplicates. Strictly symmetrical evaluation satisfies the formula:

$$S(A, B) = \bigvee_{i=1}^{n} (R_i(A \to B) \wedge R_i(B \to A)),$$

where A and B correspond to the two product descriptions, S corresponds to the rules set 408, and n corresponds to the number of rules R that are found in the rules set S.

In contrast to strictly symmetrical evaluation, symmetrical evaluation relaxes the rigidity of the same rules succeeding in both ways, and simply requires that the set of rules, generally succeed in both directions for the document comparison component 310 to conclude that the documents are duplicates. Symmetrical evaluation satisfies the following formula:

$$S(A, B) = \left(\bigvee_{i=1}^{n} R_i(A \to B)\right) \wedge \left(\bigvee_{i=1}^{n} R_i(B \to A)\right),$$

where A and B correspond to the two product descriptions, S corresponds to the rules set 408, and n corresponds to the number of rules R that are found in the rules set S.

Finally, asymmetrical evaluation further relaxes the rigidity of the previous two such that the document comparison component 310 concludes that the two product descriptions are duplicates if a rule succeeds in either direction. The formula for asymmetrical evaluation is:

$$S(A, B) = \bigvee_{i=1}^{n} (R_i(A \to B) \vee R_i(B \to A)),$$

where A and B correspond to the two product descriptions, S corresponds to the rules set 408, and n corresponds to the number of rules R that are found in the rules set S.

In regard to the evaluation direction, in order to ensure that PD1 410 and PD2 412 are potential duplicates, it is often desirable for the document comparison component 310 to not only determine whether PD1 410 is contained in PD2 412, but also that PD2 is contained in PD1. This is especially important and desirable when the two product descriptions PD1 410 and PD2 412 are related to each other, but do not describe the same item. For example, consider a product description for a laptop, model number "IQ-71560," and a second product description for a replacement battery for the laptop described in the first product description. The product description for the laptop would likely include its model number, "IQ-71560," in one or more attribute fields. Similarly, the product description for the replacement battery would also likely include the laptop model number, "IQ-71560," within its description due to its particular relationship to the laptop. Thus, one skilled in the art can easily appreciate how the document comparison component 310 could determine that the product description for the battery could be largely contained within the product description of the laptop, though they describe different products. In this light, it is therefore advantageous to determine containment in both directions (i.e., whether the first product description is contained in the second product description, and further determine whether the second product description is contained in the first product description).

Returning again to FIG. 7, at control block 704, a looping construct is begun to iterate/loop through the rules of the rules set 408. This looping construct includes steps 706-708 and ends at end control block 710. Moreover, at end control block 710, the routine 700 returns to control block 704 and repeats the iterated steps so long as there are additional rules in the rules set 408 to be processed. Accordingly, at block 706, the product descriptions PD1 410 and PD2 412 are evaluated according to the current selected rule, and further according to the evaluation direction for the rule to determine if they are duplicates. Evaluation of a rule is described below in regard to FIG. 8. At block 708, a Boolean result indicating whether or not they are duplicates is obtained from the evaluation. Moreover, if the result is "true," then a score corresponding to the strength of the match with respect to the current rule is also obtained. These results are used in block 712, as will be discussed below. After obtaining the results, at end control block 710 the routine 700 either returns to control block 704 to process additional rules in the rules set 408 or, when all the rules in the rules set have been evaluated, proceeds to block 712.

At block 712, results of the rule evaluations of the rules in the rules set 408 are evaluated and from them a determination is made as to whether, according to the rules set 408, product descriptions PD1 410 and PD2 412 are potential duplicates. In one embodiment, this determination is made according to a disjunction of the Boolean results, such that if any rules succeeded individually (i.e., the result of the evaluation was true), the overall determination is success. Moreover, the matching score for the potential duplicate finding is the maximum score obtained from each rule evaluation, and when the evaluation of a rule is false the score for that rule is zero. After the overall success and score of the evaluation is determined, at block 714 the results are returned and the routine 70 terminates.

Figure 8A:
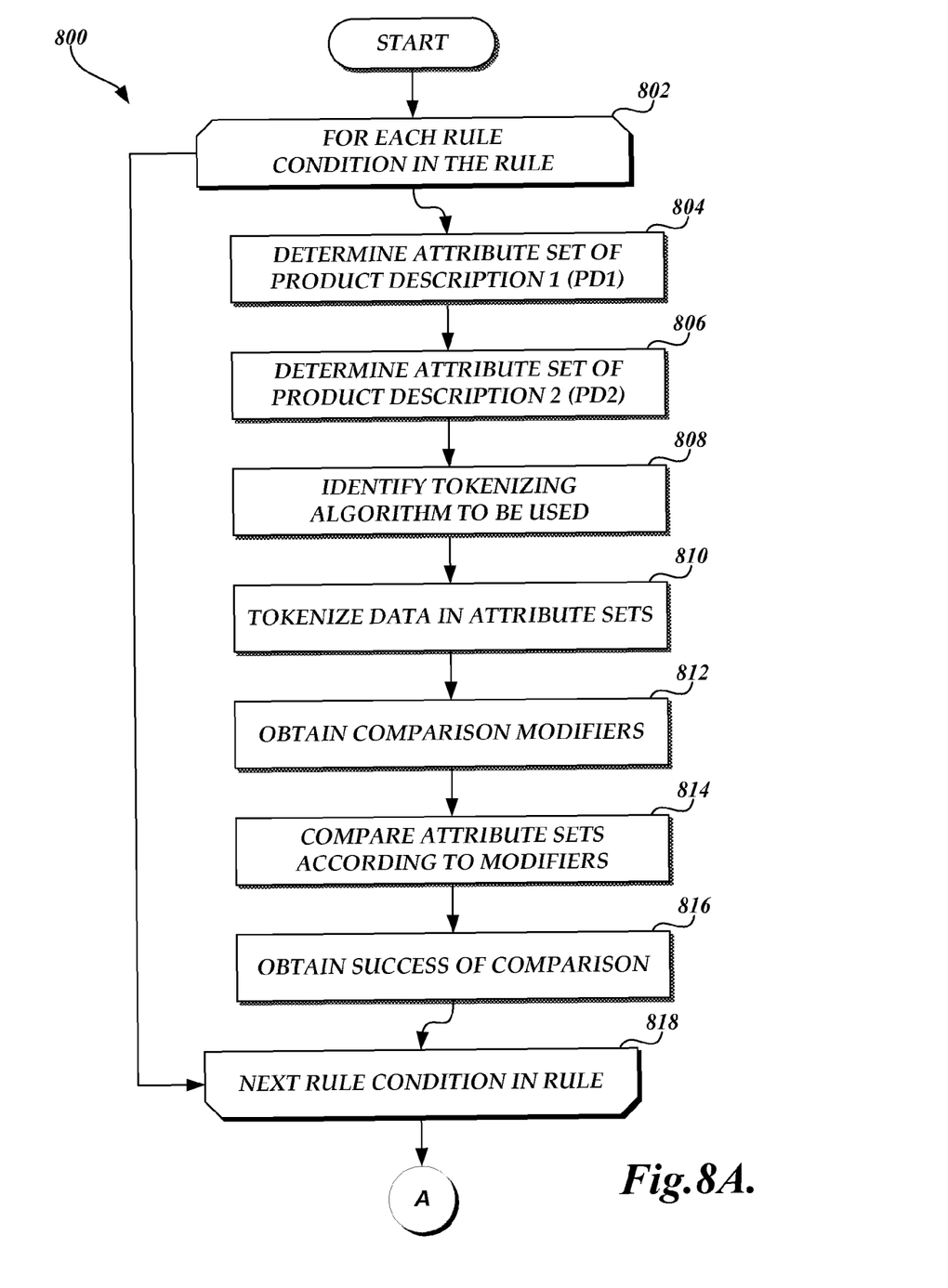
FIGS. 8A and 8B show a flow diagram of an illustrative routine for evaluating rule conditions of a rule as part of comparing whether a first product description is a duplicate of a second product description.
Figure 8B:
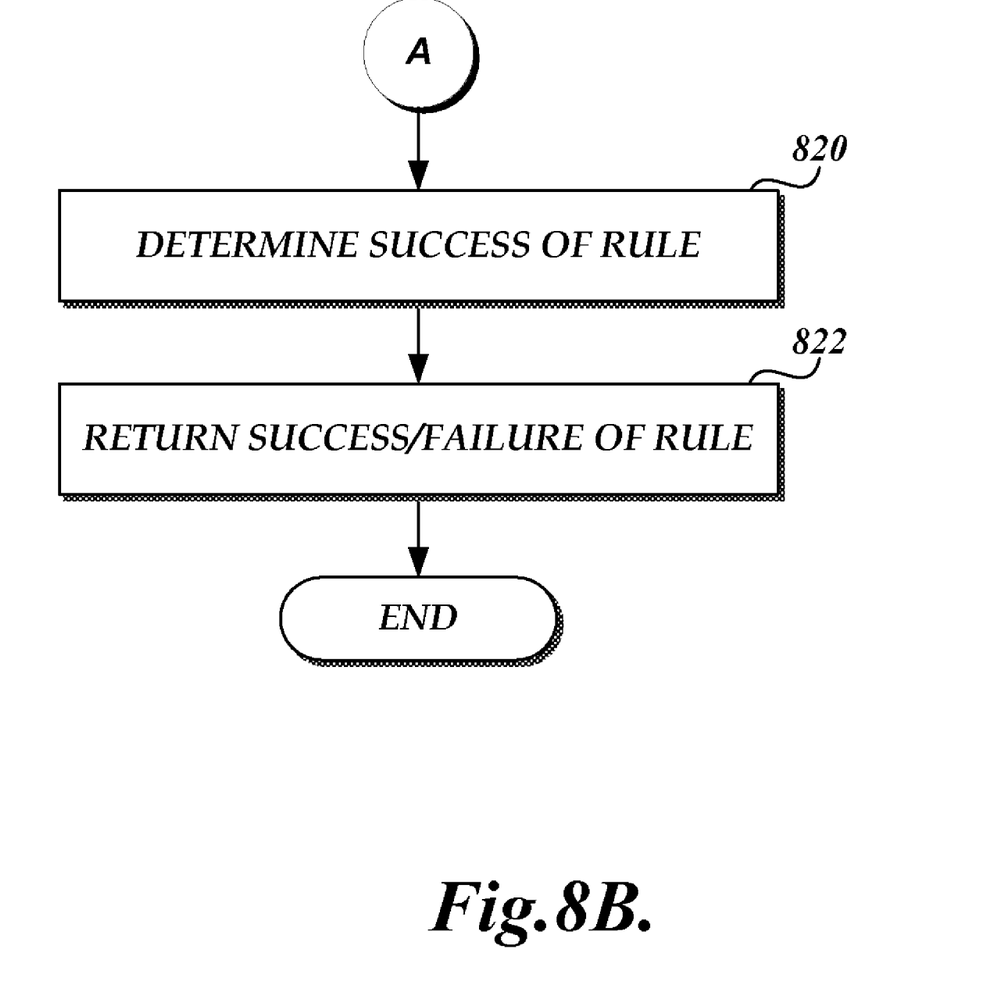

Turning now to evaluating a rule, particularly its rule elements, with regard to two product descriptions PD1 410 and PD2 412 (as referenced in block 706), FIGS. 8A and 8B show a flow diagram of an illustrative routine 800 for evaluating rule conditions of a rule as part of comparing whether a first product description (PD1 410) is a duplicate of a second product description (PD2 412). Beginning at control block 802 (FIG. 8A), a looping construct is begun to iterate/loop through the rule conditions of the particular rule to be evaluated. This looping construct includes steps 804-816 and ends at end control block 818. Moreover, at end control block 818, the routine 800 returns to control block 802 and repeats the iterated steps so long as there are additional rule conditions in the rule to be processed.

At block 804, the set of attributes of the first product description PD1 410 are determined and/or identified from the current rule condition. Correspondingly, at block 806, the set of attributes of the second product description PD2 412 are determined from the rule condition. At block 808, a tokenizing algorithm to be implemented by the tokenizer component 402 in converting the data from both sets of attributes into "matchable" tokens is identified. Typically, the generated tokens are categorized into alphabetic, alpha-numeric, and numeric tokens. The tokenizing algorithm may optionally be identified in the rule condition or rely upon a default selection. Illustratively, but not limiting, the various tokenizing algorithms include: a "whitespace" algorithm that, when implemented by the tokenizer component 402, tokenizes attribute data based on white space; a "Lucene's standard" algorithm that uses Lucene's standard analyzer to tokenize attribute data; and an "aggressive Lucene" that uses Lucene's standard analyzer to tokenize attribute data and then splits alpha-numeric tokens into alphabetic and numeric sub-parts. In one embodiment, if a tokenizer is not specified, the default selection is a "whitespace" tokenizer. Accordingly, at block 810, the data in the various identified attribute sets is tokenized. While the attribute data is tokenized, it should be appreciated that the structure of the attributes is preserved. In other words, data from a product_number attribute are converted into tokens from a product_number attribute field, and the tokens from the first product description PD1 410 are separate from the tokens of the second product description PD2 412. The two token sets are compared to establish the degree to which the token set of PD1 is contained in the token set of PD2.

At block 812, comparison modifiers are obtained and/or identified from the rule condition to be evaluated. These comparison modifiers include, but are not limited to, comparator modifiers, directional modifiers, strength of match modifiers, as well as a cascading modifier, and a "match at least one" modifier.

In regard to comparator modifiers, in one embodiment, as a default alpha-numeric tokens are compared for exact match (after converting all alphabetic characters to lower case characters); numeric tokens are compared as numeric values; and alphabetic tokens are compared for exact match (after converting all characters to lower case). However, a rule condition may optionally specify that "approximate" comparisons occur. These approximate comparisons may include: a "Levenstein" comparison corresponding to a Levenstein based edit-distance comparison algorithm; a "phonetic" comparison corresponding to a comparator algorithm that uses the Refined Soundex code and the Double Metaphone code of the tokens as a basis for comparison; a "prefix" comparison corresponding to an algorithm that weights prefixes heavily (i.e., sil and silver would be scored high); a "consonant" comparison corresponding to a comparison algorithm that drops vowels from words for comparison purposes (unless the vowel is at the start of a word); a "stemmed" comparison corresponding to a comparison algorithm that applies language-appropriate stemming and compares the stemmed tokens; and an "exact" comparison corresponding to an exact string comparison algorithm after converting alphabetic characters to lower (or upper) case. Optionally, more than one comparator modifier may be specified such that token are compared using each specified comparator. When more than one comparator modifier is specified, the score associated with a token match is the maximum of the scores obtained using all of the specified comparison algorithms.

While rules can be applied directionally, rule conditions may also be applied with directionality. More particularly, all matches described by a rule condition are directional, i.e., the set of tokens from the attributes of PD1 410 are compared with the tokens from the attributes of PD2 412. Since the set of attributes from the second product description PD2 412 is typically larger than the set of attributes from the first product description PD1 410, as specified by a rule condition, the match that is executed by the rule condition is a containment match. This evaluates the degree to which the tokens from the attributes of the first product description PD1 410 are contained within the token set generated from the attributes of the second product description PD2 412. However, in some cases, it may be desirable to specify additional directional behavior that makes the comparison more aggressive or conservative as needed. For example, it may be desirable to have a rule condition succeed if the comparison succeeds in either direction (the tokens of PD1 410 to the tokens of PD2 412, or vice-versa). This would be viewed as an asymmetric match and may be specified as a directional modifier, perhaps by using the keyword "ASYMMETRIC" in the rule condition. Alternatively, it may be desirable to specify a symmetric match, i.e., one where the match must succeed with regard to comparing the tokens of PD1 410 to the tokens of PD2 412 and vice-versa. A symmetrical match may be specified in the rule condition using a keyword "SYMMETRIC." Still another "directional" modifier is based on a Jaccard comparison algorithm based on the two sets of tokens. The Jaccard comparison algorithm can be specified by using the keyword "JACCARD" and the functionality is expressed as follows:

$$GeneralizedJaccard(S, T, A, B) = \frac{[S(A) \cap T(B)] \cup [S(B) \cap T(A)]}{S(A) \cup S(B)},$$

where S corresponds to a set of attributes of first (or source) product description A, and T corresponds to a of attributes of a second (or target) product description B, correspond to the two to the item described in T. Moreover, S(A) corresponds to the tokens generated from the values/data of the attributes in attribute set S of product description A and, correspondingly, T(B) corresponds to the tokens generated from the values/data of the attribute set T of product description B. Similarly, S(B) corresponds to the tokens generated from the values/data of attribute set S as found in product description B, and T(A) corresponds to the tokens generated from the values/data of attribute set T found in product description A.

It should be appreciated that while the Jaccard formula has been applied to comparing text segments to determine similarity, the disclosed subject matter inventively applies the above generalized Jaccard formula to compare sets of tokens derived from non-identical sets of attributes. By way of example, assume a rule condition that is specified as follows:

jaccard MATCH title WITH items_set USING THRESHOLD 0.80, which corresponds to a directive to perform a generalized Jaccard comparison between tokens in the "title" attribute of a first product description and tokens in the attributes identified by "items_set" from the second product description, and further using a matching threshold of 0.80. Further still, assume that the "title" attribute of the first product description were as follows:

Title: Eureka Vibragroom II (SC964) Vacuum Cleaner,
And the "items_set" attributes of the second product description were the following:

Manufacturer: Eureka Vacuum Cleaner Corp.,
Part Number: SC964,
Title: Vibragroom II Upright Vacuum Cleaner.

From the above examples, and assuming that A is the first product description and B is the second product description, the token sets are as follows:

S(A)={eureka vibragroom II sc964 vacuum cleaner},
S(B)={vibragroom II upright vacuum cleaner},
T(A)={eureka vibragroom II sc964 vacuum cleaner},
T(B)={eureka vacuum cleaner corp sc964 vibragroom II upright}.

Applying the generalized Jaccard comparison algorithm, we have the following:

S(A) intesection T(B)={eureka vibragroom II sc964 vacuum cleaner},
S(B) intersection T(A)={vibragroom II vacuum cleaner}.

Still further, the numerator in the generalized Jaccard comparison algorithm is the union of the two above sets={eureka vibragroom II sc964 vacuum cleaner}. The cardinality of this set is six (6). The denominator is the union of S(A) and S(B) or the set, {eureka vibragroom II sc964 upright vacuum cleaner}, and its cardinality is seven (7). The generalized Jaccard score is 6/7, or 0.85. Per the definition of the rule condition, this score would pass, i.e., return a positive result (as well as a strength of match score of 0.85.)

Another rule condition modifier is the strength of match modifier. In this regard, the rule condition can be configured according to a desired strength of matching, as expressed either by representative tokens or as a value within a range such as from 0.00 to 1.00. Exemplary tokens for indicating a desired strength of match illustratively, but not by limitation, include: EXACT (1.00), KEY STRONG (0.95), VERY STRONG (0.90), STRONG (0.80), MODERATE (0.70), WEAK (0.60), and VERY WEAK (0.50). In one embodiment, unless specified to the contrary, the desired strength defaults to EXACT.

The cascading modifier refers to a cascading match. A cascading match means that the attributes are considered for matching in the order they are described. More particularly, when comparing data from the first product description PD1 to tokens of the second product description PD2, if the first attribute is present in the attributes of PD2 and the token from PD1 is not matched to tokens in the first attribute, the rule condition evaluates to false. However, if the first attribute is not present in the attributes of PD2, the process moves to a second attribute of PD2. By way of illustration, assume that most merchants provide the model in a model_number attribute, but some merchants may include the model in the part_number attribute. Thus, when both part_number and model_number attributes are provided, it may be desirable to match the model first to the part_number attribute, and if that attribute is not found, to match the model number to the model_number attribute. This type of "cascading" processing may be indicated via a cascading modifier.

The alternative to cascading evaluation, and the default when cascading is not specified, is an "at least one" matching. With regard to the example above, under "at least one' matching, if the token from the first product description was found in either the product_number attribute or the model_number attribute, irrespective of which was listed first, the rule condition would succeed (i.e., evaluate to true.)

Another modifier, the "accept missing" modifier, permits success when attributes are missing that would otherwise result in an evaluation to false. Continuing the example above, if "accept missing" were added with the cascading modifier, the rule condition would succeed even when both the part_number attribute and the model_number attribute were missing. The converse to "accept missing" is a "do not accept missing" modifier. The following tables identify the four possibilities and outcomes with regard to the cascade, "at least one," "accept missing," and "do not accept missing modifiers," where "NULL" implies that the attribute is missing.

| At Least One | | Rule Result | |
| --- | --- | --- | --- |
| Attribute 1 | Attribute 2 | Do not Accept Missing | Accept Missing |
| NULL | NULL | FALSE | TRUE |
| NULL | Matched | TRUE | TRUE |
| NULL | Not Matched | FALSE | FALSE |

-continued

| At Least One | | Rule Result | |
|---|---|---|---|
| Attribute 1 | Attribute 2 | Do not Accept Missing | Accept Missing |
| Not Matched | NULL | FALSE | FALSE |
| Not Matched | Matched | TRUE | TRUE |
| Not Matched | Not Matched | FALSE | FALSE |
| Matched | Not Evaluated | TRUE | TRUE |
| Matched | Not Evaluated | TRUE | TRUE |
| Matched | Not Evaluated | TRUE | TRUE |

| Cascade | | Rule Result | |
|---|---|---|---|
| A1 | A2 | Do not Accept Missing | Accept Missing |
| NULL | NULL | FALSE | TRUE |
| NULL | Matched | TRUE | TRUE |
| NULL | Not Matched | FALSE | FALSE |
| Not Matched | Not Evaluated | FALSE | FALSE |
| Not Matched | Not Evaluated | FALSE | FALSE |
| Not Matched | Not Evaluated | FALSE | FALSE |
| Matched | Not Evaluated | TRUE | TRUE |
| Matched | Not Evaluated | TRUE | TRUE |
| Matched | Not Evaluated | TRUE | TRUE |

In addition to various modifiers, Boolean logic may be included as part of the rule condition. For example, an illustrative rule condition may semantically state:

Match all tokens from Attribute A of the first product description PD1 with all tokens from Attributes B OR C of the second product description PD2.

Another example, including both OR and AND, may state:

Match all tokens from Attribute A of the first product description PD1 in all tokens from Attributes B OR C AND D of the second product description PD2.

As is typical in Boolean expressions, the conjunctive AND has precedence over the disjunctive OR.

Returning now to FIG. 8A, after having obtained the various comparison modifiers, at block 814 the comparator component 404 evaluates the current rule condition consistent with the various obtained comparison modifiers and further consistent with the Boolean logic that may be expressed. At block 816, the results of the rule condition are obtained and maintained for later evaluation of the entire rule (in block 820, FIG. 8B).

After having processed the current rule condition, at end control block 818 the routine 800 returns to control block 802 if there are additional rule conditions to be evaluated. Alternatively, if all rule conditions have been evaluated, the routine 800 proceeds to block 820 (FIG. 8B). At block 820, based on the results of the various rule condition evaluations, a determination is made regarding the success or failure of the rule in general. In one embodiment, the success of the rule is based on the conjunction of the success of each rule condition specified in the rule. Thus, if one rule condition fails (i.e., evaluates to false), the rule fails as well. Only if all rule conditions evaluate to true is the rule considered to have evaluated to true. While not shown, if the rule evaluates to true, a strength of matching score is determined from the results of evaluating the rule conditions. In this regard, the sore for the rule is determined according to the average of the scores generated by the various rule conditions. Of note, when a rule condition succeeds even when all attributes are missing (as a result of the "accept missing" modifier being present) the score for that rule condition is zero and is not included as part of the strength of matching score for the rule.

While the above discussion has been made with regard to product descriptions, it should be appreciated that the disclosed subject matter may be suitably applied to structured documents in general, and the disclosed subject matter should not be construed as limited to product descriptions. It should be further noted that while the above described routines 600, 700, and 800 demonstrate a particular order of execution of logical steps, those skilled in the art will appreciate that these routines may be reordered, combined with other steps, or logical steps may be broken down into discrete sub-steps without depart from the scope described.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented system for determining whether a first product description is a potential duplicate of a second product description, wherein the first and second product descriptions are structured such that they include attributes that store attribute data in attribute fields, the system comprising:

a processor that executes computer-executable instructions from a memory; and a memory that stores computer executable instructions and data;

wherein the computer-implemented system is configured to obtain the first and second product descriptions, and in response:

obtain a set of rules for evaluating whether the first product description is a potential duplicate of the second product description, wherein the set of rules comprises at least one rule for evaluation with regard to the first product description and the second product description to determine whether the first product description is a potential duplicate of the second product description, and wherein each rule of the set of rules comprises at least one rule condition for evaluation with regard to data in a corresponding first set of attributes in the first product description and data in a corresponding second set of attributes in the second product description to determine whether the first product description is a potential duplicate of the second product description, and wherein the first set of attributes in the first product description is not equivalent to the second set of attributes in the second product description;

evaluate the set of rules with regard to the first product description and the second product description to determine whether the first product description is a potential duplicate of the second product description;

wherein, in evaluating the set of rules, evaluate each rule in the set of rules and determine whether the first product description is a potential duplicate of the second product description according to the disjunction of the results of each evaluated rule;

wherein, in evaluating each rule in the set of rules, for each rule in the set of rules, evaluate each rule condition based on the corresponding first set of attributes in the first product description and the corresponding second set of attributes in the second product description and determine the results of the rule according to the conjunction of the results of each evaluated rule condition; and if the evaluation of the set of rules indicates that the first product description is a potential duplicate of the second product description, store a reference to the first product description in a set of potential duplicates for the second product description in a data store.

2. The computer-implemented system of claim 1, wherein the evaluation of the set of rules comprises an evaluation in a direction from the first product description to the second product description and an evaluation in a direction from the second product description to the first product description.

3. The computer-implemented system of claim 2, wherein the evaluation of the set of rules is performed in a symmetrical manner.

4. The computer-implemented system of claim 2, wherein the evaluation of the set of rules is performed in a strictly symmetrical manner.

5. The computer-implemented system of claim 2, wherein the evaluation of the set of rules is performed in an asymmetrical manner.

6. A computer-implemented system for determining whether a first product description is a potential duplicate of a second product description, wherein the first and second product descriptions are structured such that they include attributes that store attribute data in attribute fields, the system comprising:
   a processor;
   a memory coupled to the processor; and
   computer executable code stored at least in part in the memory, wherein the computer executable code, upon execution, causes the computer-implemented system to:
      obtain a set of rules for evaluating whether the first product description is a potential duplicate of the second product description;
      obtain data from a first set of attributes of the first product description, the first set of attributes being determined according the set of rules;
      obtain data from a second set of attributes of the second product description, the second set of attributes being determined according to the set of rules, and wherein attribute fields within the first set of attributes and attribute fields within the second set of attributes are not identical;
      evaluate the set of rules with regard to the data from the first set of attributes and the data from the second set of attributes; and
      in response to the evaluation of the set of rules indicating that the first product description is a potential duplicate of the second product description, store a reference to the first product description in a set of potential duplicates for the second product description in a data store.

7. The computer-implemented system of claim 6, wherein the computer executable code, upon execution, causes the computer-implemented system to evaluate the data from the first set of attributes with regard to the data from the second set of attributes according to a generalized Jaccard algorithm.

8. The computer-implemented system of claim 6, wherein the computer executable code, upon execution, causes the computer-implemented system to evaluate the set of rules the set of rules according to a disjunction of an evaluation of a plurality of rules in the set of rules.

9. The computer-implemented system of claim 8, wherein a rule of the plurality of rules comprises a set of rule conditions and wherein the computer executable code, upon execution, causes the computer-implemented system to evaluate the rule according to a conjunction of an evaluation of each condition within the set of rule conditions.

10. A computer-implemented method for determining whether a first document is a potential duplicate of a second document such that the two documents describe the same or substantially the same subject matter, and wherein the first and second documents include attributes that store attribute data in attribute fields, the method comprising:
   obtaining a rule, wherein the rule associates a first set of attributes in the first document with a second set of attributes in the second document, and wherein attribute fields within the first set of attributes is not equivalent to attribute fields within the second set of attributes;
   determining whether data from the first set of attributes is contained in the second set of attributes;
   determining whether data from the second set of attributes is contained in the first set of attributes; and
   storing a reference to the first document in a set of potential duplicates of the second document in response to determining that data from the first set of attributes is contained in the second set of attributes and data from the second set of attributes is contained in the first set of attributes.

11. A tangible computer-readable medium bearing computer-executable instruction which, when executed on a computing device having a processor and a memory, carry out a method for determining whether a first document is a potential duplicate of a second document such that the two documents describe the same or substantially the same subject matter, and wherein the first and second documents include attributes that store attribute data in attribute fields, the method comprising:
   obtaining a rule, wherein the rule associates a first set of attributes in the first document with a second set of attributes in the second document, and wherein attribute fields from the first set of attributes are not the same as attribute fields from the second set of attributes;
   determining whether data from the first set of attributes is included within the second set of attributes;
   determining whether data from the second set of attributes is included within the first set of attributes;
   storing a reference to the first document in a set of potential duplicates of the second document in response to determining that data from the first set of attributes is included within the second set of attributes and data from the second set of attributes is included within the first set of attributes.

12. An article of manufacture comprising a computer readable storage medium having program instructions stored thereon that, in response to execution by a computer system, cause the computer system to perform operations including:
   receiving a first product description associated with a first product;
   receiving a second product description associated with a second product;
   selecting a rule set that defines a comparison between at least one token within a first set of attribute fields of the first product description and at least one token within a second set of attribute fields of a second product description, wherein the first set of attribute fields is different from the second set of attribute fields;
   evaluating the rule set in a first direction from the first set of attribute fields to the second set of attribute fields;
   evaluating the rule set in a second direction from the second set of attribute fields to the first set of attribute fields; and
   determining whether the first product is a duplicate of the second product in response to both evaluation operations.

13. The article of manufacture of claim 12, wherein the second set of attribute fields is larger than the first set of attribute fields.

14. The article of manufacture of claim 12, wherein determining whether the first product is the duplicate of the second product comprises obtaining at least one token match in both the first and second directions.

15. The article of manufacture of claim 12, wherein the rule set defines the comparison in a symmetrical manner satisfied by:

$$S(A, B) = \left(\bigvee_{i=1}^{n} R_i(A \to B)\right) \wedge \left(\bigvee_{i=1}^{n} R_i(B \to A)\right),$$

wherein A corresponds to the first product description, B corresponds to the second product description, S corresponds to the rule set, R corresponds to a rule within the rule set, and n corresponds to a number of rules within the rule set.

16. The article of manufacture of claim 12, wherein the rule set defines the comparison in a strictly symmetrical manner satisfied by:

$$S(A, B) = \bigvee_{i=1}^{n} R_i(A \to B) \wedge R_i(B \to A),$$

wherein A corresponds to the first product description, B corresponds to the second product description, S corresponds to the rule set, R corresponds to a rule within the rule set, and n corresponds to a number of rules within the rule set.

17. The article of manufacture of claim 12, wherein the rule set defines the comparison in an asymmetrical manner satisfied by:

$$S(A, B) = \bigvee_{i=1}^{n} (R_i(A \to B) \vee R_i(B \to A)),$$

wherein A corresponds to the first product description, B corresponds to the second product description, S corresponds to the rule set, R corresponds to a rule within the rule set, and n corresponds to a number of rules within the rule set.

18. The article of manufacture of claim 12, wherein the program instructions, in response to execution by the computer system, further cause the computer system to execute a Jaccard algorithm that compares the at least one token within the first set of attribute fields with the at least one token within the second set of attribute fields.

19. The article of manufacture of claim 12, wherein the rule set comprises a plurality of rules, and each of the plurality of rules is evaluated in a cascading manner.

20. The article of manufacture of claim 12, wherein at least one rule within the rule set comprises a rule condition, the rule condition including Boolean logic.

* * * * *